(12) United States Patent
Genda (10) Patent No.: US 11,677,882 B2
(45) Date of Patent: Jun. 13, 2023

(54) INFORMATION PROCESSING DEVICE, INFORMATION PROCESSING METHOD, RECORDING MEDIUM, AND IMAGE FORMING SYSTEM

(71) Applicant: Konica Minolta, Inc., Tokyo (JP)

(72) Inventor: Daisuke Genda, Kawasaki (JP)

(73) Assignee: Konica Minolta, Inc., Tokyo (JP)

( * ) Notice: Subject to any disclaimer, the term of this patent is extended or adjusted under 35 U.S.C. 154(b) by 280 days.

(21) Appl. No.: 17/197,584

(22) Filed: Mar. 10, 2021

(65) Prior Publication Data

US 2021/0314450 A1 Oct. 7, 2021

(30) Foreign Application Priority Data

Apr. 2, 2020 (JP) .............................. JP2020-066398

(51) Int. Cl.
 *H04N 1/00* (2006.01)
(52) U.S. Cl.
 CPC ..... *H04N 1/00084* (2013.01); *H04N 1/00029* (2013.01); *H04N 1/00037* (2013.01); *H04N 1/0097* (2013.01); *H04N 1/00408* (2013.01)
(58) Field of Classification Search
 None
 See application file for complete search history.

(56) References Cited

U.S. PATENT DOCUMENTS

2016/0231964 A1* 8/2016 Oki ....................... H04N 1/047
2020/0013158 A1* 1/2020 Asai ..................... G06T 7/0002
2020/0301336 A1* 9/2020 Tsuchiya .............. G03G 15/553

FOREIGN PATENT DOCUMENTS

JP 2016-146514 A 8/2016

* cited by examiner

*Primary Examiner* — Dov Popovici
(74) *Attorney, Agent, or Firm* — Osha Bergman Watanabe & Burton LLP (57) ABSTRACT

An information processing device includes a processor holding restoration information that associates (i) defects predicted to occur in an inspection image read from a recording medium, (ii) a restoration operation for preventing each of the defects from occurring, and (iii) an executing device that executes the restoration operation, with one another. The processor extracts, from the restoration information, the restoration operation associated with one of the defects designated on a display screen displaying the inspection image read from the recording medium, and instructs the executing device to execute the extracted restoration operation.

17 Claims, 8 Drawing Sheets

| (1) CHARACTERISTIC AMOUNT OF DEFECT | (2) PART | (3) RESTORATION OPERATION | (4) OPERATION ORDER [n] |
|---|---|---|---|
| 001 | SCANNER (IMAGE READING DEVICE) | CLEANING PROCESSING | 1 |
| | | NOTIFICATION OF REPAIR (REPLACEMENT) | 2 |
| 002 | PHOTOCONDUCTOR DRUM (MAIN BODY DEVICE) | VOLTAGE COMPENSATION | 1 |
| | | CLEANING PROCESSING | 2 |
| | | NOTIFICATION OF REPAIR (REPLACEMENT) | 3 |
| 003 | TRANSFER BELT (MAIN BODY DEVICE) | CLEANING PROCESSING | 1 |
| | | NOTIFICATION OF REPAIR (REPLACEMENT) | 2 |
| ⋮ | ⋮ | ⋮ | |
| 000 | — | DETAILED DIAGNOSING PROCESSING (a) | 1 |
| | | DETAILED DIAGNOSING PROCESSING (b) | 2 |

INFORMATION PROCESSING DEVICE, INFORMATION PROCESSING METHOD, RECORDING MEDIUM, AND IMAGE FORMING SYSTEM

CROSS-REFERENCE TO RELATED APPLICATION

The entire disclosure of Japanese Patent Application No. 2020-66398, filed on Apr. 2, 2020, is incorporated herein by reference in its entirety.

BACKGROUND

Technical Field

The present invention relates to an information processing device, an information processing method, a non-transitory recoding medium storing information processing instructions, and an image forming system.

Description of the Related Art

Among image forming devices that form an image on a sheet-like recording medium, there is an image forming device provided with an image inspecting device that detects a defect in the formed image. As such the technology, there is a technology disclosed in Patent Literature 1 (Japanese Unexamined Patent Application Publication No. 2016-146514) described below. In Patent Literature 1 (Japanese Unexamined Patent Application Publication No. 2016-146514), when the abnormality of the defect is detected by an image inspecting section 20 (the step S5; Y), a history creating section 21 creates the text of the name of the abnormality of the defect, as the detection information of the abnormality of the defect. The history creating section 21 buries the created text into one or more rectangular regions including an image region where the abnormality of the defect is detected in a scan image (the step S6). This displays the scan image into which the text is buried, thereby enabling the detection information of the abnormality to be simply confirmed.

PATENT LITERATURE

Patent Literature 1: Japanese Unexamined Patent Application Publication No. 2016-146514

However, in the technology described above, when the compensation or maintenance for preventing the detected abnormality is executed, the operation of instructing the compensation or maintenance cannot be executed for the scan image in which the information about the abnormality is displayed. Consequently, while the scan image is confirmed, the compensation or maintenance is required to be instructed by the operation for an image different from the scan image or other operating means, so that the operation is complicated.

SUMMARY

Accordingly, one or more embodiments of the present invention provide an information processing device, an information processing method, a non-transitory recoding medium storing information processing instructions, and an image forming system in which when a defect is detected in an image formed by an image forming device, a restoration operation for the defect can be instructed by a simple procedure.

One or more embodiments of the present invention provide an information processing device provided with: a restoration information holding section (i.e., a controller) that holds restoration information that associates each of respective defects predicted to occur in an inspection image read from a recording medium, a restoration operation for preventing the each defect from occurring, and a device executing the restoration operation; a restoration operation extracting section (i.e., the controller) that extracts, from the restoration information holding section, the restoration operation associated with the defect designated on a display screen in the inspection image read from the recording medium; and a restoration operation instructing section (i.e., the controller) that instructs the execution of the restoration operation extracted by the restoration operation extracting section to the device executing the restoration operation.

According to one or more embodiments of the present invention, it is possible to provide an information processing device, an information processing method, a non-transitory recoding medium storing information processing instructions, and an image forming system in which when the defect is detected in the image formed by the image forming device so that the restoration operation for the defect can be instructed by a simple procedure.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of an information processing device, an information processing method, a non-transitory recoding medium storing information processing instructions, and an image forming system to which the present invention is applied will be described in detail with reference to the drawings.

The Image Forming System

Figure 1:
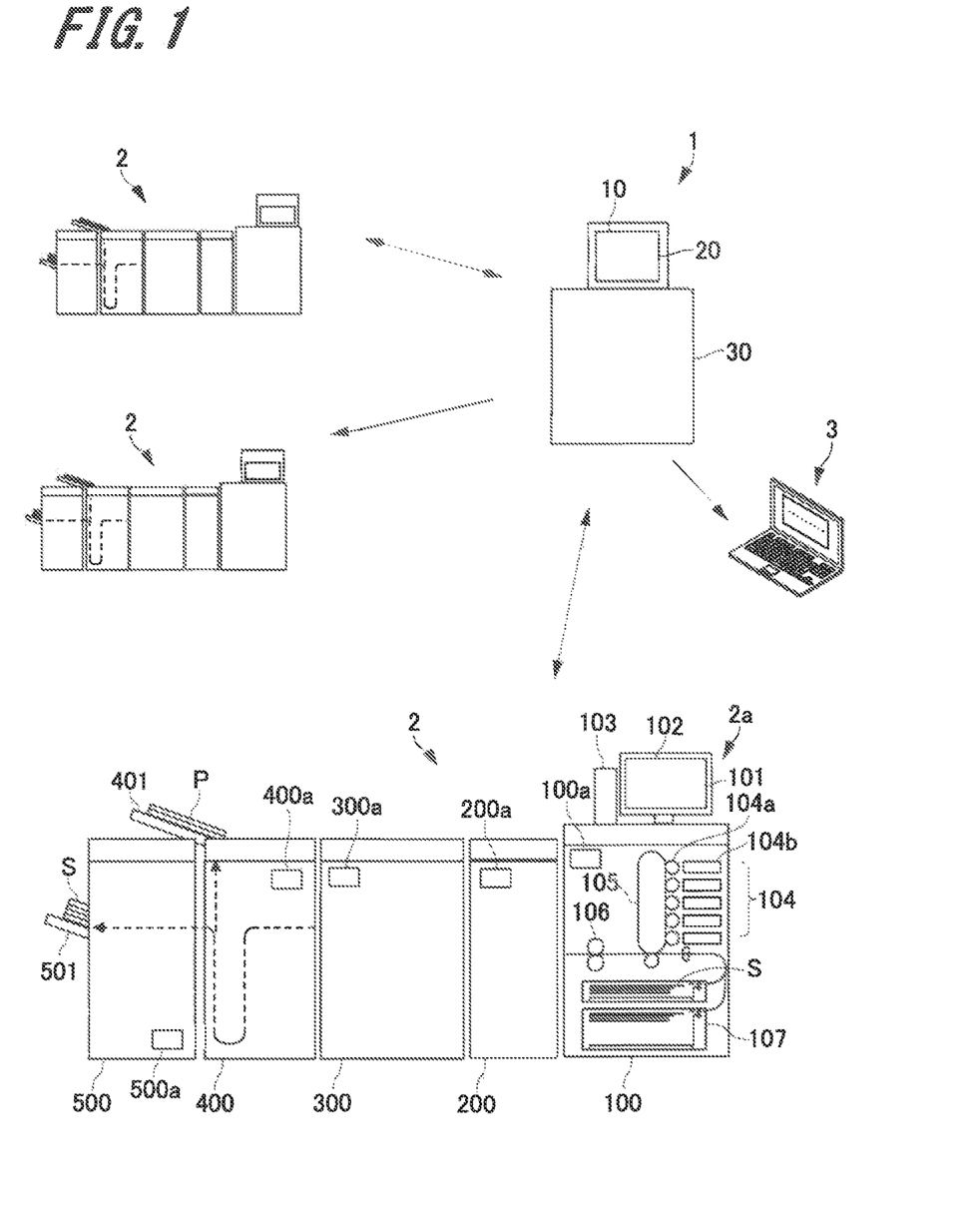
FIG. 1 is a schematic diagram illustrating the configuration of an image forming system having an information processing device according to one or more embodiments of the present invention.

FIG. 1 is a schematic diagram illustrating the configuration of the image forming system having an information processing device 1 according to one or more embodiments. The image forming system illustrated in these drawings has, for example, the information processing device 1, a plurality of image forming devices 2 and a service terminal device 3 that can communicate with the information processing device 1. Hereinafter, the configuration will be described in the order of each of the image forming devices 2, the information processing device 1, and the service terminal device 3.

The Image Forming Device 2

The image forming device 2 is provided with a main body device 100, a relay unit 200, an image reading device 300, a purge unit 400, and a finisher 500.

The Main Body Device 100

The main body device 100 is a device that forms an image on a sheet-like recording medium S. Here, as an example, such the main body device 100 is the image forming device of the electrophotographic type that forms a toner image, but is not limited to this, and may be a device of other type, such as, for example, the ink jet type.

Such the main body device 100 is provided with an operating section 101, a displaying section 102, and a controlling section 103. Also, the main body device 100 of the electrophotographic type is provided with image forming units 104, a transfer belt 105, a fixing section 106, and a medium feeding section 107, and further has a drive controlling section (i.e., a drive controller) 100a, which may comprise a CPU (Central Processing Unit), for controlling the drive of these. Hereinafter, the respective configuring parts of the main body device 100 will be described.

The Operating Section 101, the Displaying Section 102, and the Controlling Section 103

The operating section 101, the displaying section 102, and the controlling section 103 configure a controlling device 2a of the image forming device 2. Among these, the operating section 101 is, for example, a portion that inputs the setting of a job executed by using the image forming device 2. The operating section 101 may be a touch panel provided integrally with the displaying section 102, and configures an operation panel together with the displaying section 102.

Also, the displaying section 102 displays the content of the operation by the operating section 101. Also, the displaying section 102 displays the image formed by the image forming device 2 and other images.

The controlling section 103 controls the respective portions of the main body device 100 on the basis of the operation by the operating section 101 and a reception signal from the information processing device 1 connected to the main body device 100, and further controls the operation of the respective portions of the relay unit 200, the image reading device 300, the purge unit 400, and the finisher 500. Such the controlling section 103 is configured of a calculator. The calculator is hardware used as a so-called computer. The calculator is provided with a CPU (Central Processing Unit), a ROM (Read Only Memory), and a RAM (Random Access Memory).

The Image Forming Units 104

The image forming units 104 form the toner images of respective colors, and are provided corresponding to the respective colors. Each of the respective image forming units 104 is provided with a photoconductor drum 104a and an exposing section 104b, and is also provided with an electrifying section, a developing section, and other parts that are not illustrated here.

Among these, the photoconductor drum 104a is one of image bearing bodies on which the toner images are formed, and has a drum shape rotated by a drive motor, its drum-shaped side circumference surface being an image bearing face. The respective image forming units 104 that have such the photoconductor drums 104a are disposed so as to be parallel in the axial direction of the photoconductor drums 104a.

Around such the photoconductor drum 104a, the exposing section 104b and the electrifying section, the developing section, and a cleaning unit that are not illustrated here are disposed over the axial direction of the photoconductor drum 104a.

The exposing section 104b forms an electrostatic latent image by exposure scan on the image bearing face of the photoconductor drum 104a electrified by the electrifying section. And, the developing section that is not illustrated here forms the toner image of each color on the image bearing face of the photoconductor drum 104a on which the electrostatic latent image is formed, by supplying the electrified toner onto the image bearing face of the photoconductor drum 104a.

The Transfer Belt 105

The transfer belt 105 is disposed in parallel with the image forming units 104. The transfer belt 105 is configured as a rotating endless belt, its outer circumference face being an image bearing face. Such the transfer belt 105 rotates in the opposite direction of the rotating direction of the respective photoconductor drums 104a of the image forming units 104, and is disposed in a state where an image bearing face 31a sequentially comes into contact with all the photoconductor drums 104a. This transfers the toner images of the photoconductor drums 104a onto the image bearing face of the transfer belt 105.

Also, the transfer belt 105 is disposed in a state of bringing the image bearing face into contact with the recording medium S conveyed from the medium feeding section 107 described next. This transfers, onto the recording medium S, the toner image on the image bearing face of the transfer belt 105.

The Fixing Section 106

The fixing section 106 is disposed on the downstream side of the transfer belt 105 with respect to the conveying direction of the recording medium S conveyed from the medium feeding section 107 described next. The fixing section 106 nips and conveys the recording medium S in the heated state. On the recording medium S, the toner image is transferred from the transfer belt 105. The fixing section 106 fixes, onto the recording medium S, the toner image transferred onto the recording medium S. Also, the recording medium S onto which the toner image is fixed is conveyed to the relay unit 200. Such the fixing section 106 is provided with respective parts, such as a heating roller and a pressurizing roller for nipping the recording medium S.

The Medium Feeding Section 107

The medium feeding section 107 can accommodate a large amount of recording media S, and sequentially feeds the accommodated recording media S to the transfer belt 105.

The Relay Unit 200

The relay unit 200 is, for example, a device that converts the conveying speed of the recording medium S image formed by the main body device 100 according to the instruction from the controlling section 103 of the main body device 100, and sends the recording medium S into the image reading device 300 at the next stage. The relay unit 200 has a drive controlling section (i.e., a drive controller) 200a, which may comprise a CPU (Central Processing Unit), for converting the conveying speed of the recording medium S.

The Image Reading Device 300

The image reading device 300 reads the image formed on the principal face of the recording medium S by the main body device 100 according to the instruction from the controlling section 103 of the main body device 100, and transmits, to the information processing device 1, the image data of an inspection image acquired by the reading. The transmission of the inspection image to the information processing device 1 may be executed through the controlling device 2a.

Such the image reading device 300 is a machine element portion for imaging the principal face of the recording medium S, and has a scanner in which imaging elements are arrayed in the direction perpendicular to the conveying direction [FD] of the recording medium S, and a drive controlling section (i.e., a drive controller) 300a that may comprise a CPU (Central Processing Unit) and that controls the drive of the image reading by the scanner. It should be noted that the drive controlling section 300a may be configured to execute the pass/fail determination for the read image.

The Purge Unit 400

The purge unit 400 adjusts the conveying path of the recording medium S that passes through the image reading device 300, according to the determination result by the drive controlling section 300a of the image reading device 300 or the instruction from the information processing device 1 described next. That is, the purge unit 400 changes the conveying path of the recording medium S in which it is determined by the drive controlling section 300a of the image reading device 300 or the information processing device 1 that there is a defect in the inspection image, and ejects the recording medium S onto a discarding tray 401. Also, other recording media S are conveyed to the finisher 500 at the next stage. Such the purge unit 400 has a drive controlling section (i.e., a drive controller) 400a that may comprise a CPU (Central Processing Unit) and that controls the drive of the change of the conveying path.

The Finisher 500

The finisher 500 subjects the finish processing when required to the recording medium S conveyed from the purge unit 400 according to the instruction from the controlling section 103 of the main body device 100, and ejects the recording medium S onto a tray 501. The finishing processing is, for example, scoring, slit formation, perforation formation, and the like. Such the finisher 500 is provided with a drive controlling section (i.e., a drive controller) 500a that may comprise a CPU (Central Processing Unit) and that controls the drive for the finishing processing.

The Information Processing Device 1

Figure 2:
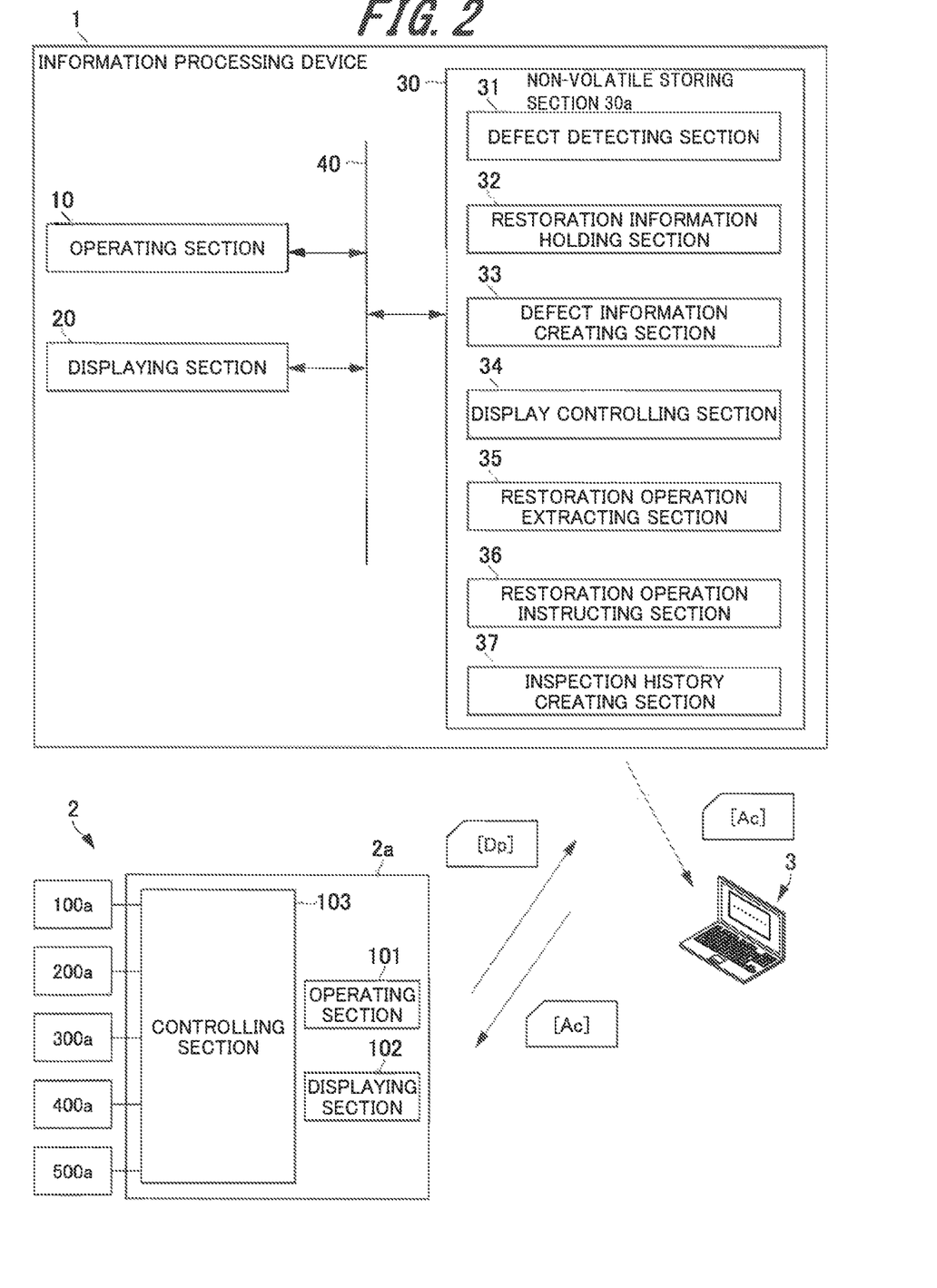
FIG. 2 is a block diagram of the image forming system having the information processing device according to one or more embodiments of the present invention.

FIG. 2 is a block diagram of the image forming system having the information processing device 1 according to one or more embodiments, and in particular, is a block diagram for explaining the configuration of the information processing device 1. Hereinafter, the configuration of the information processing device 1 will be described with reference to FIGS. 1 and 2 described previously and other drawings when required.

The information processing device 1 performs the processing for the image data about an inspection image [Dp] for the image formed by the image forming device 2, and in particular, executes the processing for restoring the defect that occurs in the image. For example, such the information processing device 1 may be connectable with the plurality of image forming devices 2, as illustrated, or may be connectable with another image forming device 2 in a state of being formed integrally with one image forming device 2, or may be dedicatedly provided in one image forming device 2.

The information processing device 1 is provided with an operating section 10, a displaying section 20, and a controlling section 30. Among these, the operating section 10 is a portion that inputs the setting of the information processing executed by the information processing device 1. The operating section 10 may be a touch panel provided integrally with the displaying section 20 described next, or may be an operation panel provided separately from the displaying section 20.

Also, the displaying section 20 displays the content of the operation by the operating section 10. Also, the displaying section 20 displays the inspection image [Dp] on the basis of the instruction from the controlling section 30 described later. It should be noted that such the operating section 10 and the displaying section 20 may be a personal computer or other external device enabling communication for the transfer of the data with the information processing device 1 provided with the controlling section 30.

Also, the controlling section 30 is configured of a calculator. The calculator is hardware used as a so-called computer (i.e., a processor), and is provided with a non-volatile storing section 30a, such as a CPU (Central Processing Unit), a RAM (Random Access Memory), and a ROM (Read Only Memory), and an HDD (hard disk drive) that are not illustrated here.

Such the controlling section 30 stores various images and various instructions in the non-volatile storing section 30a, and executes the processing on the basis of each of the stored instructions. Each of the various instructions held by the non-volatile storing section 30a includes the information processing instructions for restoring the defect that occurs in the characteristic image in one or more embodiments. The detail of the information processing instructions will be described in the information processing method described later.

Respective functioning sections of the controlling section 30 that execute the various instructions held by the non-volatile storing section 30a are a defect detecting section 31, a restoration information holding section 32, a defect information creating section 33, a display controlling section 34, a restoration operation extracting section 35, a restoration operation instructing section 36, and an inspection history creating section 37. These respective functioning sections are as follows.

The Defect Detecting Section 31

The defect detecting section 31 detects the defect in the inspection image [Dp] read from the recording medium S. The inspection image [Dp] is the data in which the image formed on the recording medium S by the main body device 100 of any one of the image forming devices 2 is read by the image reading device 300. The defect detecting section 31 detects the defect that occurs in the inspection image [Dp], by comparing the inspection image [Dp] acquired by reading the image formed by the image forming device 2 by the image reading device 300 with a reference image without the defect.

Figure 3:
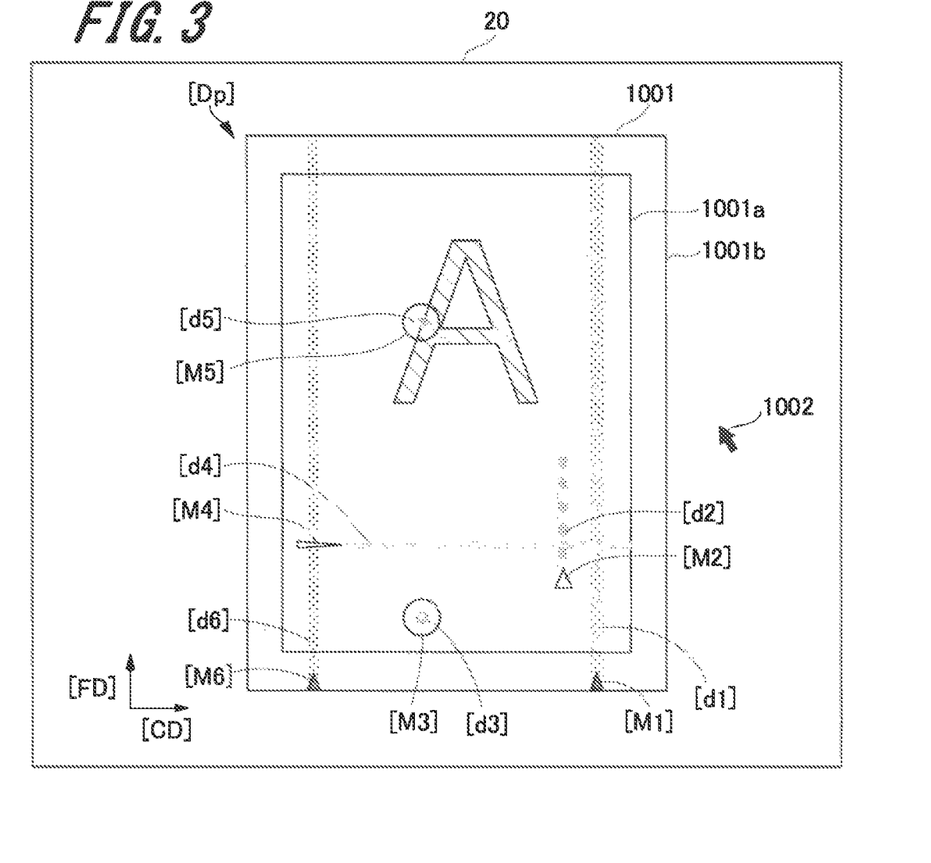
FIG. 3 is a diagram (1) illustrating the display of an inspection image on the basis of information processing instructions according to one or more embodiments of the present invention.
Figure 4:
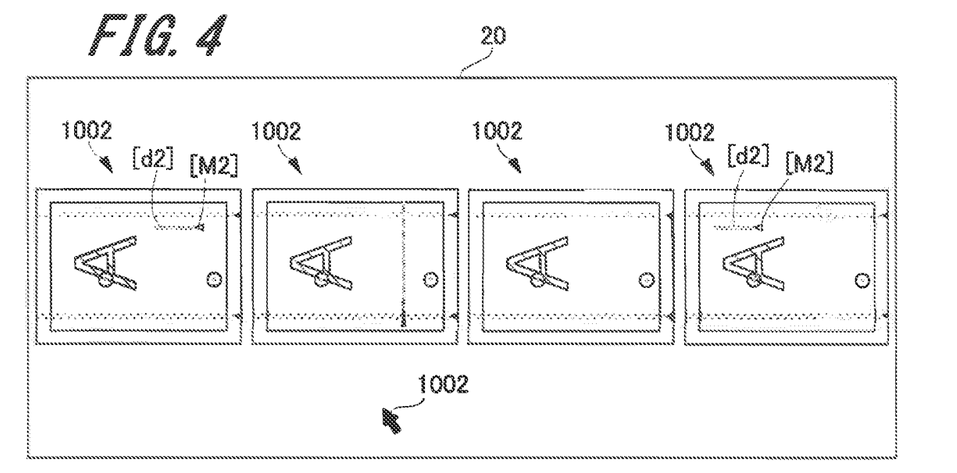
FIG. 4 is a diagram (2) illustrating the display of the inspection images on the basis of the information processing instructions according to one or more embodiments of the present invention.

FIG. 3 is a diagram (1) illustrating the display of the inspection image [Dp] on the basis of the information processing instructions according to one or more embodiments. Also, FIG. 4 is a diagram (2) illustrating the display of the inspection images [Dp] on the basis of the information processing instructions according to one or more embodiments. The inspection image [Dp] has an image region 1001a and an imaging region 1001b slightly larger than the image region 1001a. The image region 1001a is the region in which the image is formed by the main body device 100 (see FIG. 1). Here, as an example, the case where a monochromatic ground and an alphabet are formed in the image region 1001a is illustrated.

As illustrated in these drawings, in the inspection image [Dp], various defects [d1] to [d6] can occur due to the deterioration or dirt of each of the devices configuring the image forming device 2. Each of these defects [d1] to [d6] is the defect that has a directional component also called a streak, a band, or unevenness, the dot-like defect that is called a Hotaru (literally meaning "firefly") and has a low toner concentration, the dot-like defect called a spot, such as the defect in which the toner is printed in an unnecessary portion, and the like. The defect that has the directional component is the defect that continuously occurs in the addresses continuous in one direction on the inspection image [Dp]. The one direction on the inspection image [Dp] is any one of the conveying direction [FD] of the recording medium S and the perpendicular direction [CD] with respect to this.

Each of these defects [d1] to [d6] has the characteristic amount of the characteristic defect for each part of the respective devices that configure the image forming device 2. For example, in the case of each of the defects [d1], [d2], [d4], and [d6] that have the directional components, examples of the characteristic amount of the defect include the position of the defect, the extending direction of the defect, the length of the extending direction of the defect, the width in the direction perpendicular to the extending direction of the defect, the strength of the defect, and an occurrence cycle. Also, in the case of each of the dot-like defects [d3] and [d5], examples of the characteristic amount of the defect include the position of the defect, the size of the defect, the strength of the defect, and an occurrence cycle.

It should be noted that the strength of the defect is the magnitude of the difference of the inspection image with respect to the reference image. Also, among the characteristic amounts, the position of the defect also occurs in the imaging region 1001b outside the image region 1001a, like, for example, the defects [d1] and [d6], and the imaging region 1001b is also included in the range of the position of the defect.

It should be noted that as seen in the defect [d2] in FIG. 4, the occurrence cycle of the defect is often detected over a plurality of inspection images [Dp]. Thus, the defect detecting section 31 extracts the characteristic amount of each of the defects [d1] to [d6] over the plurality of inspection images [Dp].

Also, the defect detecting section 31 has defect identification information for classifying and identifying the characteristic amount extracted with respect to each defect on the basis of the past information. The defect detecting section 31 refers to the defect identification information, and assigns identification information (for example, identification number) to the extracted characteristic amount. Also, in this case, when the characteristic amount of the detected defect does not match the characteristic amounts of all of the identification numbers, the defect detecting section 31 assigns the identification number that indicates that the characteristic amount of the detected defect cannot be identified.

Also, the defect detecting section 31 executes the detection for the particularly designated defect among the defects that occur in the inspection image [Dp]. The procedure of the defect detection and the processing for extracting the characteristic amount of the defect by the defect detecting section 31 as described above will be described in detail in the information processing method described later.

The Restoration Information Holding Section 32

The restoration information holding section 32 holds restoration information [Tb1] of the part of the image forming device 2 for preventing the defect detected by the defect detecting section 31 from occurring.

Figure 5:
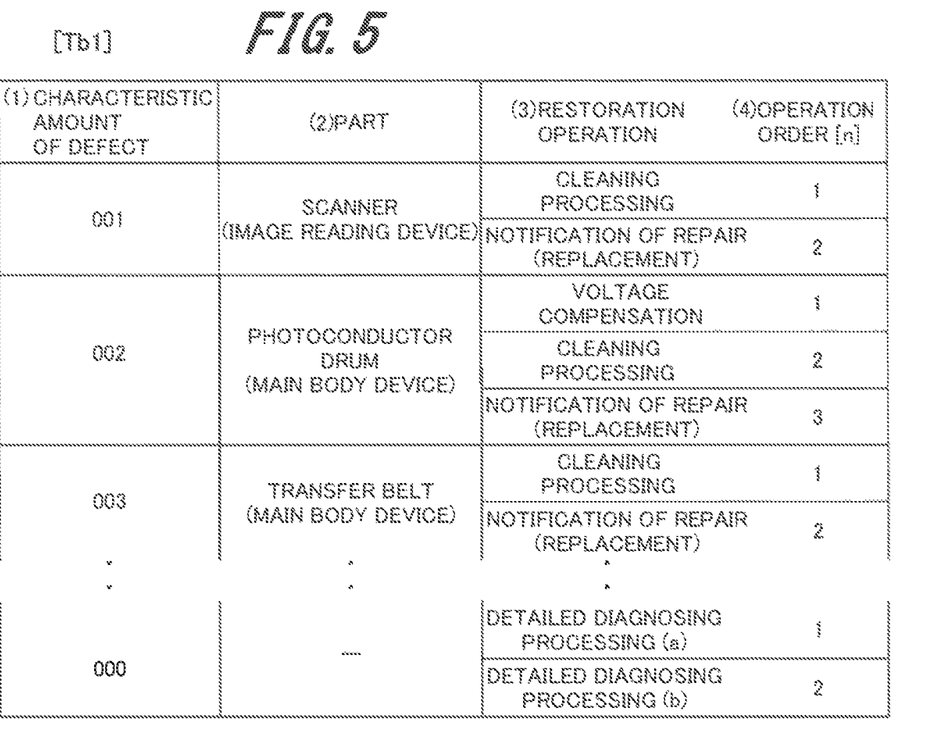
FIG. 5 is a table illustrating restoration information [Tb1] of defects that the information processing device has according to one or more embodiments of the present invention.

FIG. 5 is a table illustrating the restoration information [Tb1] of the defects that the information processing device 1 has according to one or more embodiments. As illustrated in this drawing, the restoration information [Tb1] is the information that associates (1) the characteristic amount of the defect, (2) the part, (3) the restoration operation, and (4) the operation order [n]. These pieces of information are as follows.

(1) The characteristic amount of the defect is the characteristic amount of the defect predicted to occur in the inspection image [Dp], and is, for example, the identification information of the characteristic amount assigned by the defect detecting section 31.

(2) The part is, among the parts configuring the image forming device 2, the part in which the defect having each characteristic amount is estimated to easily occur, and also includes the information of the device provided with the part. Referring to FIG. 1, examples of the part configuring the image forming device 2 include, for example, the photoconductor drum 104a and the transfer belt 105 provided in the main body device 100, and further include other parts configuring the image forming unit 104, the fixing section 106, and various sensors for adjusting the image. Also, the examples of the part configuring the image forming device 2 include the scanner provided in the image reading device 300, and further, a device for emitting illumination light for imaging.

(3) The restoration operation is, to prevent the defect detected in the inspection image [Dp] from occurring, is the content of the operation executed with respect to the part estimated to be its occurring cause. The restoration operation is the content decided for each part, and one or a plurality of types of restoration operations are associated. The plurality of restoration operations may be associated with one part.

For example, when dust, such as paper dust, is attached to the scanner of the image reading device 300, the defects [d1] and [d6] (see FIG. 3) extended to the positions that exceed to the imaging region 1001b outside the image region 1001a in the inspection image [Dp] occur. As the restoration operation with respect to the scanner in this case, the notification of the cleaning or the repair or replacement of the scanner is associated. The notification of the repair or replacement is performed by the image forming device 2 or the service terminal device 3.

Also, when a foreign substance adheres to the band electrode, the photoconductor drum 104a, or the transfer belt 105 of the main body device 100 of the image forming device 2, or deterioration is caused in the band electrode, the photoconductor drum 104a, or the transfer belt 105 of the main body device 100 of the image forming device 2, the defect [d2], such as unevenness and a streak, or each of the dot-like defects [d3] and [d5] can occur in the rotating direction. In this case, the notification of the cleaning or the repair or replacement of the part estimated by the occurrence cycle of each of the defects [d2], [d3], and [d5] is associated. When the part is the photoconductor drum 104a, the cleaning is photoconductor cleaning that makes the coating film of the surface of the photoconductor drum 104a uniform. Also, the notification of repair or replacement is performed by the image forming device 2 or the service terminal device 3.

Also, the compensation processing is also included in (3) the restoration operation. As an example, the processing for compensating the luminescence amount of the exposing section 104b of the main body device 100 is associated with the defect of the concentration unevenness in the perpendicular direction [CD] of the inspection image [Dp].

It should be noted that detailed diagnosing processing (a) and detailed diagnosing processing (b) are included in (3) the restoration operation. Each of the detailed diagnosing processing (a) and the detailed diagnosing processing (b) is, for example, the restoration operation executed when the characteristic amount of the defect cannot be classified, and instructs, for example, the formation of a color chart that is a reference or other charts.

When there are a plurality of types of restoration operations executed with respect to (2) the part associated with (1) the characteristic amount of the defect, (4) the operation order [n] is the priority order that executes the restoration operations.

The restoration information [Tb1] that associates (1) the characteristic amount of the defect, (2) the part, (3) the restoration operation, and (4) the operation order [n] that are described above is the information created on the basis of the past data. Also, when the controlling section 30 of the information processing device 1 has a learning function, the restoration information [Tb1] may be the information updated by the learning function.

The Defect Information Creating Section 33

The defect information creating section 33 assigns, to each defect, a mark that is the mark of the occurring position of the each defect. As illustrated in FIGS. 3 and 4 described previously, the defect information creating section 33 respectively assigns, to the defects [d1] to [d6] detected for the inspection image [Dp], marks [M1] to [M6] that are the marks of their occurring position. For the marks [M1] to [M6] assigned, for example, the dot-like defect [d3] is assigned the mark [M3] individually surrounding the dot-like defect [d3], and the dot-like defect [d5] is assigned the mark [M5] individually surrounding the dot-like defect [d5]. Also, the defect [d1] having the directional component is assigned the mark [M1] having the directional component at the end of the defect, the defect [d2] having the directional component is assigned the mark [M2] having the directional component at the end of the defect, the defect [d4] having the directional component is assigned the mark [M4] having the directional component at the end of the defect, and the defect [d6] having the directional component is assigned the mark [M6] having the directional component at the end of the defect.

Figure 6:
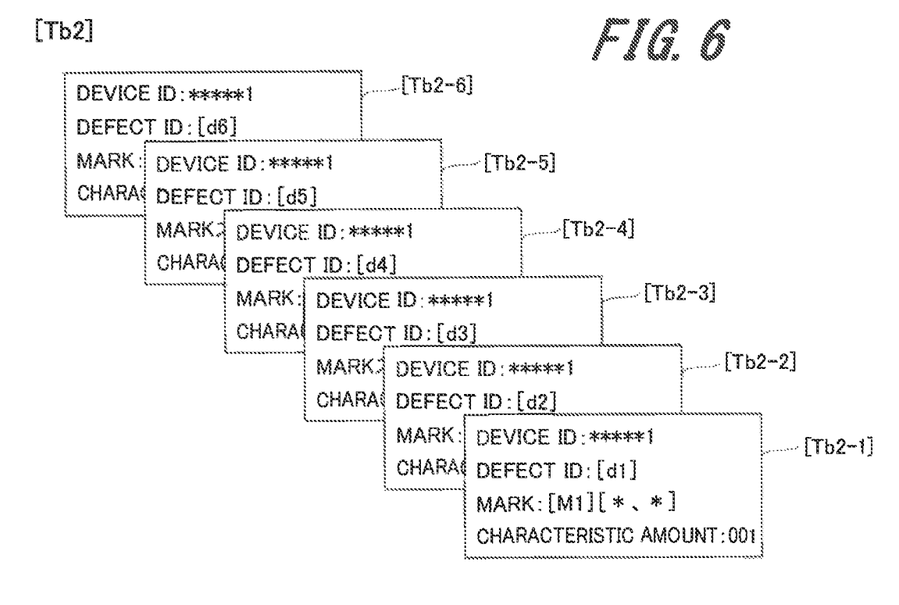
FIG. 6 is a diagram illustrating restoration information [Tb2] created on the basis of the information processing instructions of one or more embodiments of the present invention.

Also, the defect information creating section 33 creates defect information about each defect that occurs in the inspection image [Dp]. FIG. 6 is a diagram illustrating an example of defect information [Tb2] created and executed on the basis of the information processing instructions of one or more embodiments.

As illustrated in this drawing, the defect information creating section 33 creates defect information [Tb2-1] to [Tb2-6] for all the defects detected by the defect detecting section 31. The defect information [Tb2-1] is the identification information of the defect [d1], the information about the characteristic amount (the identification number of the characteristic amount) extracted with respect to the defect [d1], and the information about the mark [M1]. The defect information [Tb2-2] is the identification information of the defect [d2], the information about the characteristic amount (the identification number of the characteristic amount) extracted with respect to the defect [d2], and the information about the mark [M2]. The defect information [Tb2-3] is the identification information of the defect [d3], the information about the characteristic amount (the identification number of the characteristic amount) extracted with respect to the defect [d3], and the information about the mark [M3]. The defect information [Tb2-4] is the identification information of the defect [d4], the information about the characteristic amount (the identification number of the characteristic amount) extracted with respect to the defect [d4], and the information about the mark [M4]. The defect information [Tb2-5] is the identification information of the defect [d5], the information about the characteristic amount (the identification number of the characteristic amount) extracted with respect to the defect [d5], and the information about the mark [M5]. The defect information [Tb2-6] is the identification information of the defect [d6], the information about the characteristic amount (the identification number of the characteristic amount) extracted with respect to the defect [d6], and the information about the mark [M6]. The information about the marks [M1] to [M6] respectively include the address information of the marks [M1] to [M6] in the inspection image [Dp]. Also, each of the defect information [Tb2-1] to [Tb2-6] has the identification information of the image forming device 2 that acquires the inspection image [Dp].

Also, the defect information creating section 33 stores the defect information [Tb2-1] to [Tb2-6] as the corresponding defect information [Tb2]. The procedure for creating the defect information [Tb2] by the defect information creating section 33 described above will be described in detail in the information processing method described later.

The Display Controlling Section 34

The display controlling section 34 displays the marks [M1] to [M6] assigned by the defect information creating section 33 with respect to the inspection image [Dp] displayed on the displaying section 20. Also, when one of the defects [d1] to [d6] or one of the marks [M1] to [M6] is designated in the operation on the display screen that displays the inspection image [Dp], the display controlling section 34 highlights and displays the designated defect or the designated mark. The procedure of the display control by the display controlling section 34 described above will be described in detail in the information processing method described later.

The Restoration Operation Extracting Section 35

When the operation of designating one of the defects [d1] to [d6] or one of the marks [M1] to [M6] is performed on the display screen in the inspection image [Dp], the restoration operation extracting section 35 extracts the restoration operation from the restoration information holding section 32. The procedure of the extraction processing by the restoration operation extracting section 35 will be described in detail in the information processing method described later.

The Restoration Operation Instructing Section 36

The restoration operation instructing section 36 instructs the execution of the restoration operation extracted by the restoration operation extracting section 35 to the device executing the restoration operation. The procedure for instructing the restoration operation by the restoration operation instructing section 36 will be described in detail in the information processing method described later.

The Inspection History Creating Section 37

The inspection history creating section 37 creates a report about the inspection result of the inspection image [Dp] on the basis of the detection processing result of the defect by the defect detecting section 31. The procedure of the history creation by the inspection history creating section 37 will be described in detail in the information processing method described later.

The Service Terminal Device 3

The service terminal device 3 is the terminal device held by the person in charge of service of the image forming device 2, and is provided with notifying means, such as the displaying section.

The Information Processing Method

Figure 7:
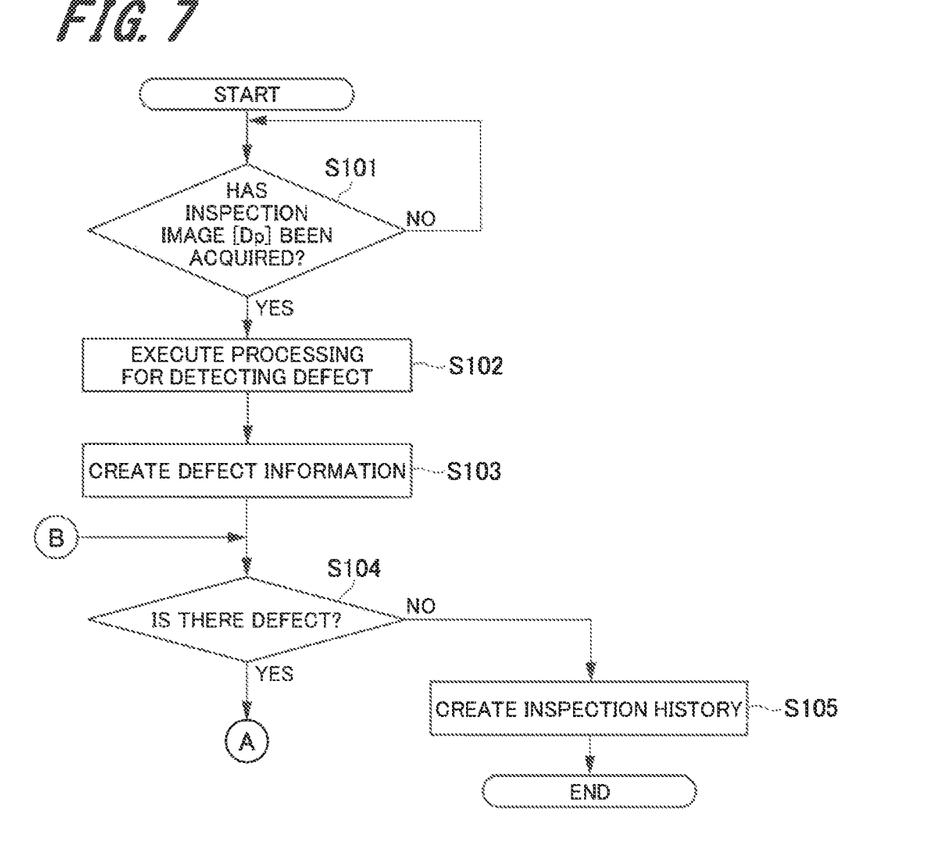
FIG. 7 is a flowchart (1) illustrating an information processing method executed on the basis of the information processing instructions of one or more embodiments of the present invention.
Figure 8:
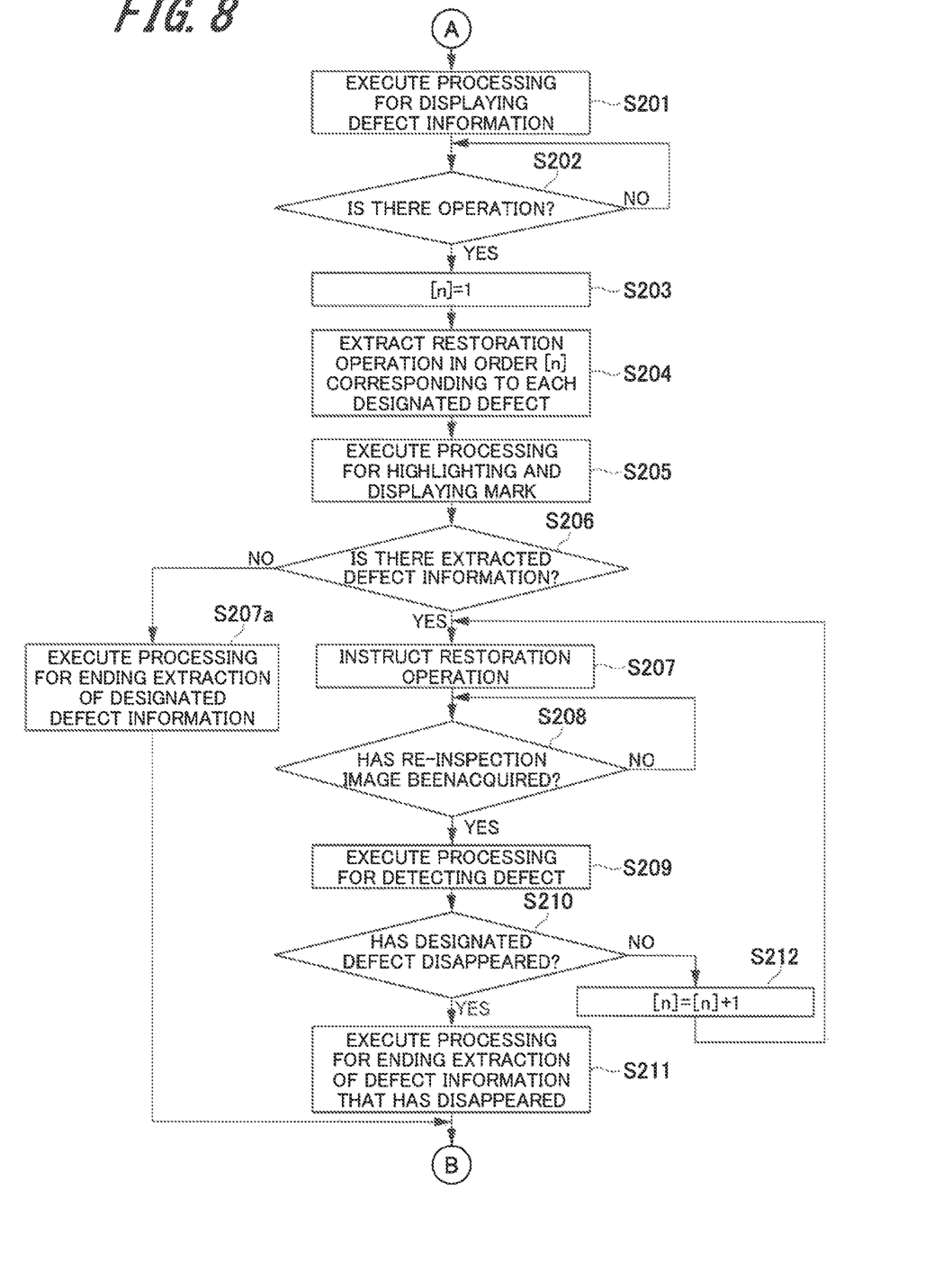
FIG. 8 is a flowchart (2) illustrating the information processing method executed on the basis of the information processing instructions of one or more embodiments of the present invention.

Next, the information processing method executed by the information processing device 1 with which the image forming system described above is provided will be described. FIG. 7 is a flowchart (1) illustrating the information processing method executed on the basis of the information processing instructions of one or more embodiments. Also, FIG. 8 is a flowchart (2) illustrating the information processing method executed on the basis of the information processing instructions of one or more embodiments. These flowcharts illustrate the procedure of the information processing method executed by the information processing instructions that the information processing device 1 described with reference to FIGS. 1 to 6 has. Hereinafter, the image processing method of one or more embodiments will be described along the flowcharts in FIGS. 7 and 8 with reference to FIGS. 1 to 6 described previously and other drawings when required.

The Step S101

First, in the step S101 in FIG. 7, the defect detecting section 31 executes the determination whether or not the inspection image [Dp] has been acquired from the image forming device 2. The inspection image [Dp] acquired here is the image read from the recording medium S by the image reading device 300 that the image forming device 2 has, and is the information transmitted from a controlling section 103 of the image forming device 2 to the information processing device 1. When determining that the inspection image [Dp] has been acquired (YES), the defect detecting section 31 goes to the next step S102.

The Step S102

In the step S102, the defect detecting section 31 executes the defect detection processing for the acquired inspection image [Dp]. In this case, the defect detecting section 31 compares the acquired inspection image [Dp] with the reference image, and detects the defect that occurs in the inspection image [Dp]. The reference image is, for example, the image acquired from the controlling section 103 of the image forming device 2 together with the inspection image [Dp], or the image acquired from the external device.

The Step S103

In the Step S103, for all the defects [d1] to [d6] detected in the step S102, the defect information creating section 33 creates the defect information [Tb2-1] (see FIG. 6) for the defect [d1] detected in the step S102, the defect information [Tb2-2] (see FIG. 6) for the defect [d2] detected in the step S102, the defect information [Tb2-3] (see FIG. 6) for the defect [d3] detected in the step S102, the defect information [Tb2-4] (see FIG. 6) for the defect [d4] detected in the step S102, the defect information [Tb2-5] (see FIG. 6) for the defect [d5] detected in the step S102, and the defect information [Tb2-6] (see FIG. 6) for the defect [d6] detected in the step S102. In this case, the defect information creating section 33 extracts the characteristic amounts of the defects [d1] to [d6], respectively, with respect to the identification information of the defects [d1] to [d6] detected in the step S102. Also, the marks [M1] to [M6] that are respectively the marks of the occurring position of the defects [d1] to [d6] are respectively assigned to the defects [d1] to [d6].

The defect information creating section 33 creates the defect information [Tb2-1] to [Tb2-6] that respectively associate the characteristic amounts of the defects [d1] to [d6] and the assigned marks [M1] to [M6] together with the identification information of the image forming device 2 that acquires the inspection image [Dp]. Then, the defect information [Tb2-1] to [Tb2-6] are stored as the corresponding defect information [Tb2]

The Step S104

In the step S104, the inspection history creating section 37 executes the determination whether or not there is the defect information in the corresponding defect information [Tb]. Then, when determining that there is the defect information (YES), the inspection history creating section 37 goes to the step S201 in the direction of A in the flow (FIG. 8). On the other hand, when determining that there is not the defect information (NO), the inspection history creating section 37 goes to the step S105.

The Step S105

In the step S105, the inspection history creating section 37 creates the inspection history about the inspection result of the inspection image [Dp] on the basis of the detection processing result of the defect by the defect detecting section 31, and ends the information processing for the defect inspection about the inspection image [Dp].

The Step S201

On the other hand, in the step S201 illustrated in FIG. 8, the display controlling section 34 displays, on the displaying section 20, a display screen 1001 in which the marks [M1] to [M6] are assigned to the respective defects in the inspection image [Dp] (see FIGS. 3 and 4).

The Step S202

In the step S202, the restoration operation extracting section 35 executes the determination whether or not the operation of designating any one of the respective defects [d1] to [d6] on the display screen 1001 in the inspection image [Dp] in which the mark [M1] is assigned to the defect [d1], the mark [M2] is assigned to the defect [d2], the mark [M3] is assigned to the defect [d3], the mark [M4] is assigned to the defect [d4], the mark [M5] is assigned to the defect [d5], and the mark [M6] is assigned to the defect [d6] has been performed.

Here, the operation of designating any one of the respective defects [d1] to [d6] is, for example, the touch operation for the mark [M1] assigned to the defect [d1], the mark [M2] assigned to the defect [d2], the mark [M3] assigned to the defect [d3], the mark [M4] assigned to the defect [d4], the mark [M5] assigned to the defect [d5], or the mark [M6] assigned to the defect [d6], or the click operation using a cursor 1002 displayed for the mark [M1] assigned to the defect [d1], the mark [M2] assigned to the defect [d2], the mark [M3] assigned to the defect [d3], the mark [M4] assigned to the defect [d4], the mark [M5] assigned to the defect [d5], or the mark [M6] assigned to the defect [d6]. When the operation of designating any one of the marks [M1] to [M6] is performed on the display screen 1001 in the inspection image [Dp], the restoration operation extracting section 35 determines that the defect (for example, the defect [d1]) assigned the mark (for example, the mark [M1]) has been designated.

When determining that the designation operation has been performed (YES), the restoration operation extracting section 35 goes to the next step S203.

The Step S203

In the step S203, the restoration operation extracting section 35 executes the processing for providing the operation order [n]=1.

The Step S204

In the step S204, the restoration operation extracting section 35 extracts the restoration operation in the operation order [n] ([n]=1) from the corresponding defect information [Tb2] (see FIG. 6) and the restoration information [Tb1] (see FIG. 5) held by the restoration information holding section 32.

In this case, the restoration operation extracting section 35 checks the corresponding defect information [Tb2] (see FIG. 6), and extracts the characteristic amount (for example, 001) of the designated defect [d1]. Then, the restoration operation extracting section 35 checks the restoration information [Tb1] (see FIG. 5), extracts (2) the part (for example, the scanner: the image reading device) associated with (1) the characteristic amount (001), and further, extracts the restoration operation in the corresponding operation order [n] (for example, [n]=1: the cleaning processing).

Further, when there is another defect (for example, the defect [d6]) associated with the same restoration operation as the designated defect [d1], the restoration operation extracting section 35 extracts the defect [d6]. Also, when there is another defect (for example, the defect [d6]) associated with the same characteristic amount (for example, 001) as the designated defect [d1], the restoration operation extracting section 35 may extract the defect [d6]. Then, the extracted defect [d6] is added to the designated defect [d6].

The Step S205

Figure 9:
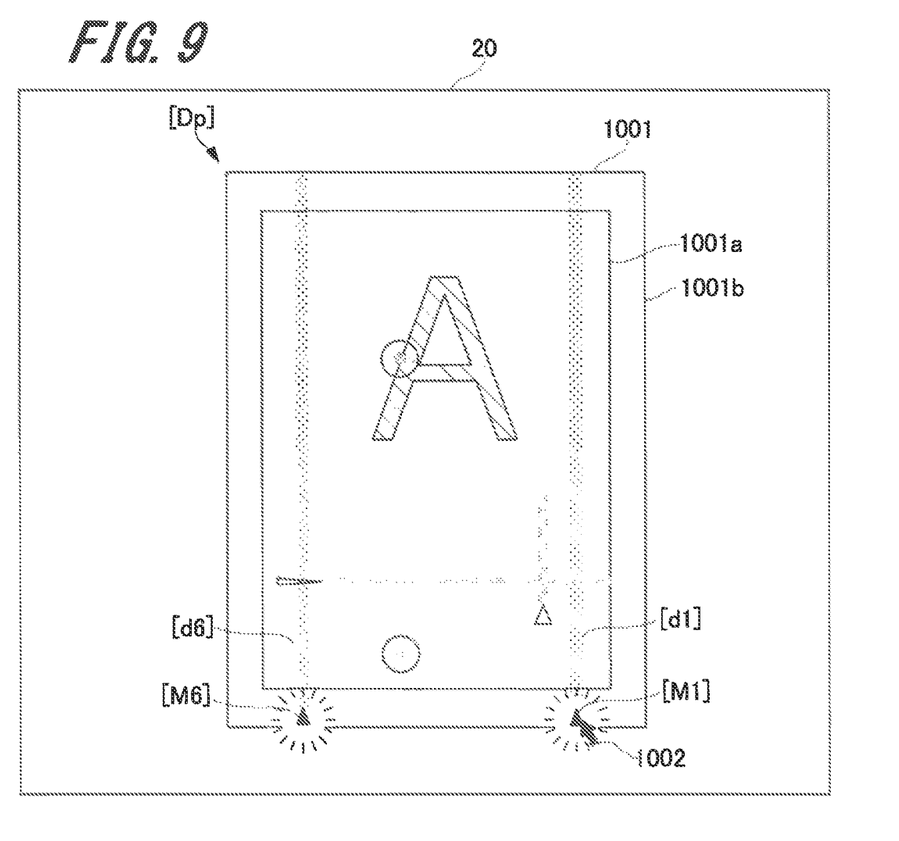
FIG. 9 is a diagram (1) illustrating a display image created on the basis of the information processing instructions of one or more embodiments of the present invention.
Figure 10:
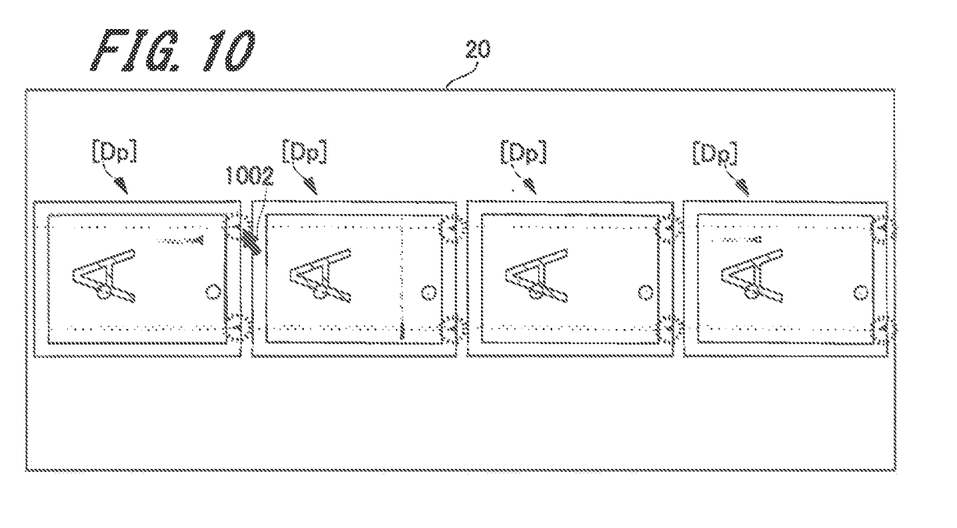
FIG. 10 is a diagram (2) illustrating the display images created on the basis of the information processing instructions of one or more embodiments of the present invention.

In the step S205, the display controlling section 34 highlights the mark [M1] assigned to the instructed defect [d1] and the mark [M6] assigned to the instructed defect [d6], and displays them on the displaying section 20. FIG. 9 is a diagram (1) illustrating the display image created on the basis of the information processing instructions of one or more embodiments. FIG. 10 is a diagram (2) illustrating the display images created on the basis of the information processing instructions of one or more embodiments. As illustrated in these drawings, the display controlling section 34 may blink the mark [M1] assigned to the instructed defect [d1] and the mark [M6] assigned to the instructed defect [d6], enlarge the display of the marks [M1] and [M6], or increase the brightness of the marks [M1] and [M6]. It should be noted that when the occurrence cycle of each of the designated defects has a magnitude across a plurality of pages, the inspection images [Dp] for the plurality of pages are displayed on one display screen, as illustrated in FIG. 10.

The Step S206

In the step S206, the restoration operation extracting section 35 executes the determination whether or not there is the extraction of the restoration operation associated with the designated defect [d1] from the restoration information [Tb1] (see FIG. 5), and goes to the next step S207 when determining that there is the extraction (YES). On the other hand, when determining that there is not the extraction (NO), the restoration operation extracting section 35 goes to the step S207a.

The Step S207a

In the step S207a, the restoration operation extracting section 35 ends the processing for extracting the restoration operation corresponding to the designated defects [d1] and [d6], and assigns the information in which the restoration operation cannot be extracted, to the defect information [Tb2-1] of the designated defect [d1] and the defect information [Tb2-6] of the designated defect [d6]. Then, the defect information [Tb2-1] of the designated defect [d1] is deleted from the corresponding defect information [Tb2], and the defect information [Tb2-6] of the designated defect [d6] is deleted from the corresponding defect information [Tb2]. Thereafter, the restoration operation extracting section 35 returns to the step S104 illustrated in FIG. 7 in the direction of B in the flow.

The Step S207

In the step S207, the restoration operation instructing section 36 instructs the execution of the restoration operation extracted in the step S204 to the device executing the restoration operation. For example, when in the step S204, the scanner (image reading device) is extracted as (2) the part and further, the corresponding operation order [n] (for example, [n]=1: the cleaning processing) is extracted, the instruction of the execution of the extracted restoration operation is transmitted to the image forming device 2 that acquires the inspection image [Dp]. It should be noted that although the scanner extracted as (2) the part is provided in the image reading device 300, the image reading device 300 is provided as the image forming device 2 integral with the main body device 100 in one or more embodiments. Thus, the restoration operation instructing section 36 may be configured to transmit the instruction of the execution of the extracted restoration operation to the image forming device 2 that acquires the inspection image [Dp].

Also, after the restoration processing is completed, the restoration operation instructing section 36 instructs, to the image forming device 2 that acquires the inspection image [Dp], the formation of the same image as the inspection image [Dp], the reading of the formed image, and the transmission of the read inspection image [Dp] to the information processing device 1.

Thus, the image forming device 2 that receives the instruction of the execution of the restoration operation executes, as the instructed restoration operation, for example, the cleaning processing for the scanner of the image reading device 300. Then, after the cleaning processing is completed, the image forming device 2 executes the formation of the same image as the inspection image [Dp], reads the formed image from the recording medium, and transmits, as the inspection image for re-inspection [Dp], the read image to the information processing device 1.

The Step S208

In the step S208, the defect detecting section 31 executes the determination whether or not the inspection image [Dp] has been acquired from the image forming device 2. The inspection image [Dp] acquired here is the image transmitted from the image forming device 2 to which the restoration operation instructing section 36 instructs the execution of the restoration operation in the step S207, and is the inspection image for re-inspection [Dp].

When determining that the inspection image [Dp] has been acquired (YES), the defect detecting section 31 goes to the next step S209.

The Step S209

In the step S209, the defect detecting section 31 executes the processing for detecting the designated defects [d1] and [d6] for the acquired inspection image for re-inspection [Dp]. In this case, the defect detecting section 31 performs the processing for detecting the designated defects [d1] and [d6] in the inspection image [Dp] acquired just previously.

The Step S210

In the step S210, the defect detecting section 31 executes the determination whether or not the designated defects [d1] and [d6] have disappeared in the inspection image [Dp] acquired just previously. Then, when determining that the designated defects [d1] and [d6] have disappeared (YES), the defect detecting section 31 goes to the step S211, and when determining that the designated defects [d1] and [d6] have not disappeared (NO), the defect detecting section 31 goes to the step S212.

The Step S211

In the step S211, the restoration operation extracting section 35 ends the processing for extracting the restoration operation corresponding to the defects [d1] and [d6] determined to have disappeared, and assigns the information in which the defect has disappeared, to each of the defect information [Tb2-1] of the defect [d1] and the defect information [Tb2-6] of the defect [d6]. Then, the defect information [Tb2-1] of the defect [d1] is deleted from the corresponding defect information [Tb2], and the defect information [Tb2-6] of the defect [d6] is deleted from the corresponding defect information [Tb2]. Thereafter, the restoration operation extracting section 35 returns to the step S104 illustrated in FIG. 7 in the direction of B in the flow.

The Step S212

In the step S212, the restoration operation extracting section 35 executes the processing for providing the operation order [n]=[n]+1. Thereafter, the restoration operation extracting section 35 returns to the step S207, executes the processing for extracting the restoration operation for the designated defects [d1] and [d6], and successively executes the subsequent steps.

The Effect of the Embodiments

According to the embodiments described above, when the operation of designating the mark [M1] assigned to the defect [d1] is performed on the display screen in the inspection image [Dp], the execution of the restoration operation associated with the designated defect is automatically instructed to the device executing the restoration operation. Thus, by the simple operation in which the target defect [d1] is designated on the display screen in the inspection image [Dp], the restoration operation for preventing the defect [d1] from occurring can be started.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . information processing device
2 . . . image forming device (device executing a restoration operation)
3 . . . terminal device (device executing the restoration operation)
31 . . . defect detecting section
32 . . . restoration information holding section
33 . . . defect information creating section
34 . . . display controlling section
35 . . . restoration operation extracting section
36 . . . restoration operation instructing section
100 . . . main body device (image forming device)
300 . . . image reading device (device executing the restoration operation)
1001 . . . display screen
S . . . recording medium
[Dp] . . . inspection image
[d1] to [d6] . . . defect
[M1] to [M6] . . . mark
[Tb1] . . . restoration information
[Tb2] . . . defect information
[Tb2-1] to [Tb2-6] . . . defect information

What is claimed is:

1. An information processing device comprising:
a processor that:
holds restoration information that associates (i) defects predicted to occur in an inspection image read from a recording medium, (ii) a restoration operation for preventing each of the defects from occurring, and (iii) an executing device that executes the restoration operation, with one another;
extracts, from the restoration information, the restoration operation associated with one of the defects designated on a display screen displaying the inspection image read from the recording medium; and
instructs the executing device to execute the extracted restoration operation.

2. The information processing device according to claim 1,
wherein the executing device is one of:
an image forming device that forms the inspection image on the recording medium;
an image reading device that reads the inspection image from the recording medium; and
a terminal device that notifies the content of a restoration operation.

3. The information processing device according to claim 1,
wherein the restoration operation is one of:
compensation of a drive condition of the executing device;
cleaning of the executing device;
notification of the content of a restoration operation; and
formation of a detailed diagnosing image.

4. The information processing device according to claim 1,
wherein the processor associates each of the defects with a part to which the executing device executes the restoration operation, and holds the each of the defects and the part.

5. The information processing device according to claim 4,
wherein the processor holds, as the restoration operation, the restoration operation executed to the part.

6. The information processing device according to claim 1,
wherein the processor further:
associates, with each of the defects, a plurality of restoration operations that are arranged in order, and holds the restoration operations, and
extracts, in the order, the restoration operations associated with the designated defect.

7. The information processing device according to claim 1,
wherein the processor further:
detects each of the defects in the inspection image and extracts a characteristic amount of the each of the defects,
holds the restoration operation associated with the characteristic amount of the each of the defects, and
extracts, from the restoration information, the restoration operation associated with the characteristic amount of the designated defect.

8. The information processing device according to claim 7,
wherein after instructing to execute the extracted restoration operation, when the same image as the inspection image is formed as a re-inspection image onto the recording medium, the processor detects the designated defect in the re-inspection image read from the recording medium.

9. The information processing device according to claim 8,
wherein when detecting the designated defect in the re-inspection image, the processor extracts, from the restoration information, another restoration operation associated with the designated defect.

10. The information processing device according to claim 1,
wherein the processor further:
creates, with respect to the inspection image, defect information in which marks are respectively assigned to the defects occurring in the inspection image, and
when any one of the marks is designated in the inspection image on the display screen, determines that one of the defects to which the designated mark is assigned has been designated.

11. The information processing device according to claim 10,
wherein when any one of the defects is designated by an operation on the display screen displaying the inspection image, the processor highlights and displays, among the marks on the display screen, a mark assigned to the designated defect, and a mark assigned to one of the defects associated with the same restoration operation as the designated defect.

12. A non-transitory recoding medium storing computer readable instructions for causing a processor to execute:
holding restoration information that associates (i) defects predicted to occur in an inspection image read from a recording medium, (ii) a restoration operation for preventing each of the defects from occurring, and (iii) an executing device that executes the restoration operation, with one another;
extracting, from the restoration information, the restoration operation associated with one of the defects designated on a display screen displaying the inspection image read from the recording medium; and
instructing the executing device to execute the extracted restoration operation.

13. An information processing method executed by a processor, the method comprising:
holding restoration information that associates (i) defects predicted to occur in an inspection image read from a recording medium, (ii) a restoration operation for preventing each of the defects from occurring, and (iii) an executing device that executes the restoration operation, with one another;
extracting, from the restoration information, the restoration operation associated with one of the defects designated on a display screen displaying the inspection image read from the recording medium; and
instructing the executing device to execute the extracted restoration operation.

14. An image forming system comprising:
the information processing device according to claim 1;
an image forming device that forms the inspection image on the recording medium;
an image reading device that reads the inspection image from the recording medium; and
a terminal device that notifies the content of a restoration operation.

15. The image forming system according to claim 14,
wherein the processor of the information processing device instructs the image forming device, the image reading device, or the terminal device to execute the extracted restoration operation.

16. The image forming system according to claim 14,
wherein the information processing device is formed integrally with a drive controller of the image forming device.

17. The image forming system according to claim 14,
wherein the image reading device is provided integrally with the image forming device,
wherein the information processing device communicates with a plurality of image forming devices, and
wherein the processor of the information processing device identifies the image forming devices, and instructs the image forming devices to execute the extracted restoration operation.

* * * * *